US012701536B2

(12) United States Patent
Li

(10) Patent No.: US 12,701,536 B2
(45) Date of Patent: Aug. 4, 2026

(54) METHOD FOR REQUESTING ON-DEMAND POSITIONING REFERENCE SIGNAL, TERMINAL AND STORAGE MEDIUM

(71) Applicant: BEIJING XIAOMI MOBILE SOFTWARE CO., LTD., Beijing (CN)

(72) Inventor: Xiaolong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 310 days.

(21) Appl. No.: 18/580,518

(22) PCT Filed: Jul. 21, 2021

(86) PCT No.: PCT/CN2021/107701
§ 371 (c)(1),
(2) Date: Jan. 18, 2024

(87) PCT Pub. No.: WO2023/000227
PCT Pub. Date: Jan. 26, 2023

(65) Prior Publication Data
US 2025/0089005 A1 Mar. 13, 2025

(51) Int. Cl.
*H04W 64/00* (2009.01)
*H04L 5/00* (2006.01)
*H04W 24/10* (2009.01)
(52) U.S. Cl.
CPC .......... *H04W 64/00* (2013.01); *H04L 5/0048* (2013.01); *H04W 24/10* (2013.01)
(58) Field of Classification Search
CPC ....... H04W 64/00; H04W 24/10; H04W 4/02; H04W 88/18; H04L 5/0048; G01S 5/0045; G01S 5/0236

USPC ...................................................... 455/456.2
See application file for complete search history.

(56) References Cited

U.S. PATENT DOCUMENTS

| | | | | |
|---|---|---|---|---|
| 2022/0404452 A1* | 12/2022 | Fischer | ................. | G01S 5/0236 |
| 2023/0336299 A1* | 10/2023 | Manolakos | ........... | H04W 24/10 |
| 2023/0362869 A1* | 11/2023 | You | ........................ | H04W 64/00 |
| 2024/0015686 A1* | 1/2024 | Rao | ........................ | H04W 64/00 |
| 2024/0187903 A1* | 6/2024 | Hasegawa | ............ | H04B 17/328 |

FOREIGN PATENT DOCUMENTS

CN          112438064 A          3/2021

OTHER PUBLICATIONS

Vivo, "Discussion on potential positioning enhancements", 3GPP TSG RAN WG1 #103-e, R1-2007666, Oct. 2020, 49 pages.
European Patent Application No. 21950484.2 Search Report dated Aug. 14, 2024, 9 pages.

(Continued)

*Primary Examiner* — Don N Vo
(74) *Attorney, Agent, or Firm* — Cozen O'Connor

(57) ABSTRACT

A method for requesting an on-demand positioning reference signal (PRS) is performed by a location management function (LMF) device. The method includes: receiving an on-demand PRS requesting message sent by a terminal, the on-demand PRS request message being used for requesting to acquire first PRS configuration information; and in response to determining that the LMF device is unable to provide the first PRS configuration information for the terminal, sending a response message to the terminal.

20 Claims, 6 Drawing Sheets receiving an on-demand PRS request message from a terminal, in which the on-demand PRS request message is configured to request to obtain first PRS configuration information — 201 sending a response message to the terminal, in response to determining that the terminal is unable to provide the first PRS configuration information for the terminal — 202

(56)  References Cited

OTHER PUBLICATIONS

PCT/CN2021/107701 International Search Report dated Apr. 20, 2022, 2 pages.
CATT "Further discussion on on-demand PRS" 3GPP TSG-RAN WG2 Meeting #114-e, R2-2104803, May 2021, 6 pages.
Convida Wireless "On-demand DL PRS transmission and reception", 3GPP TSG-RAN WG2 Meeting #114 electronic, R2-2106379, May 2021, 6 pages.

* cited by examiner

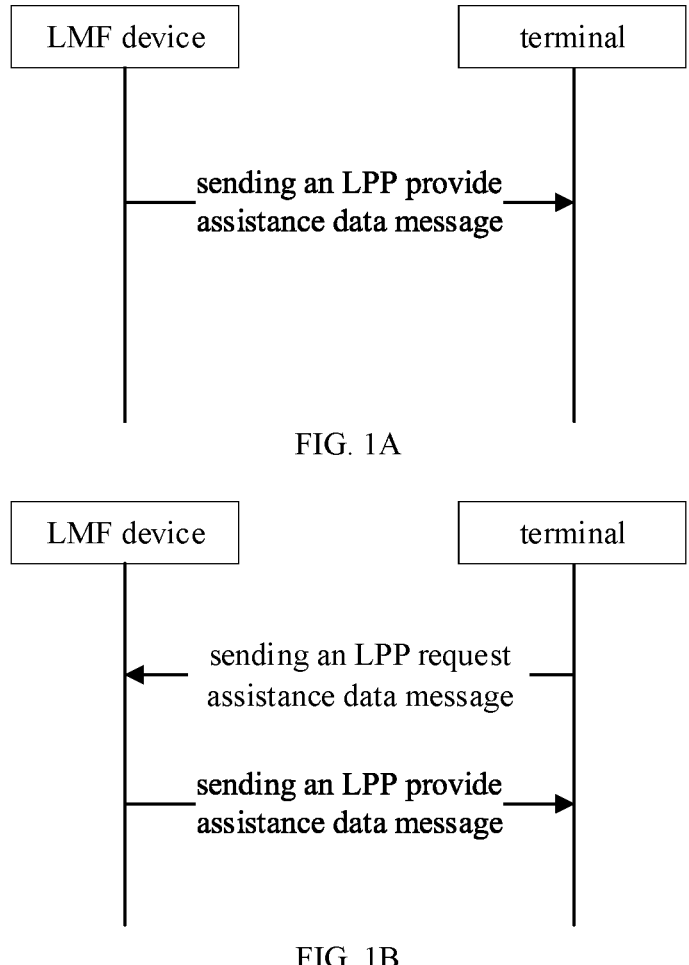
FIG. 1A
FIG. 1B
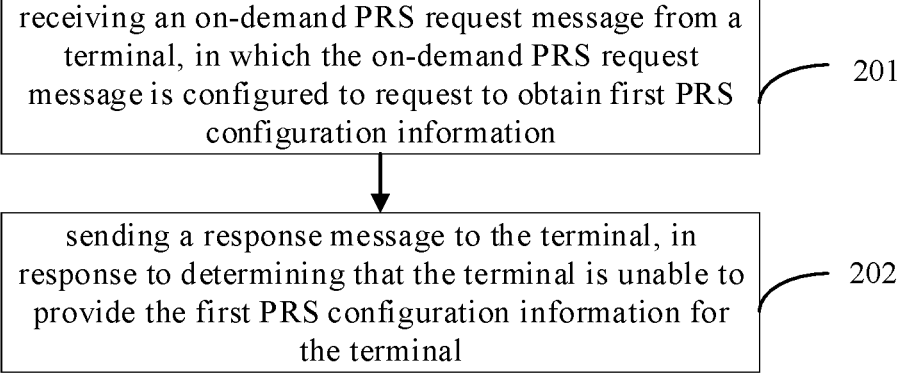
receiving an on-demand PRS request message from a terminal, in which the on-demand PRS request message is configured to request to obtain first PRS configuration information
201
sending a response message to the terminal, in response to determining that the terminal is unable to provide the first PRS configuration information for the terminal
202
FIG. 2

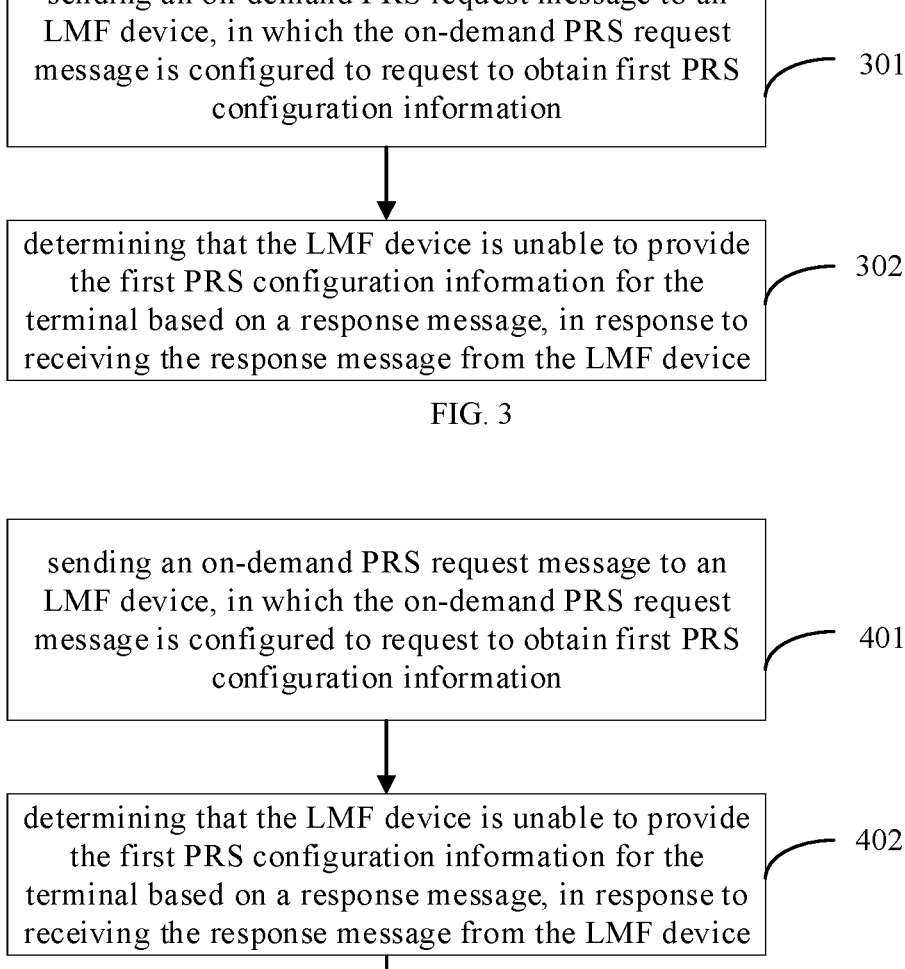

sending an on-demand PRS request message to an LMF device, in which the on-demand PRS request message is configured to request to obtain first PRS configuration information

301 determining that the LMF device is unable to provide the first PRS configuration information for the terminal based on a response message, in response to receiving the response message from the LMF device

302

FIG. 3 sending an on-demand PRS request message to an LMF device, in which the on-demand PRS request message is configured to request to obtain first PRS configuration information

401 determining that the LMF device is unable to provide the first PRS configuration information for the terminal based on a response message, in response to receiving the response message from the LMF device

402 performing the PRS measurement using second PRS configuration information based on the first indication information

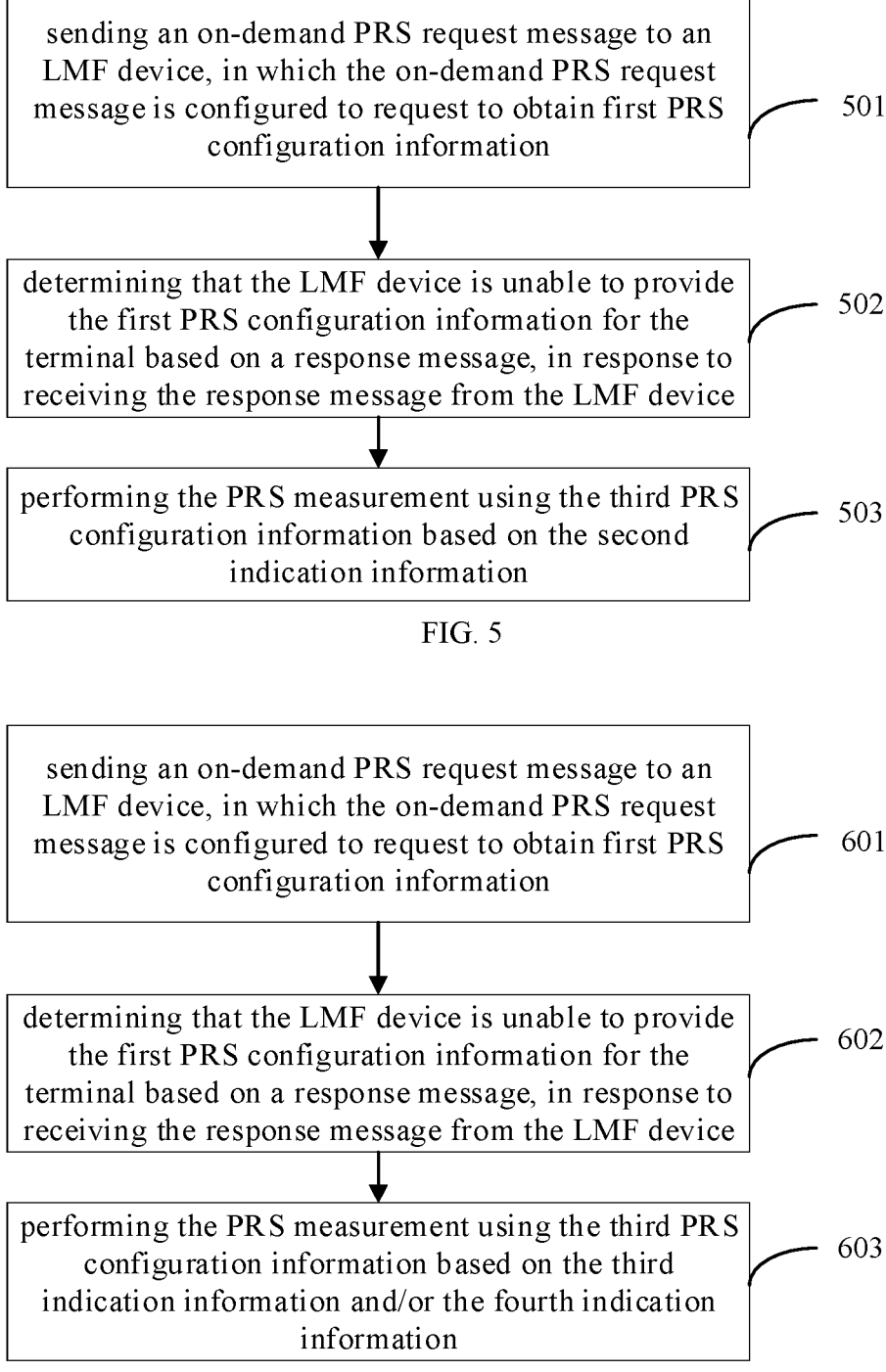

sending an on-demand PRS request message to an LMF device, in which the on-demand PRS request message is configured to request to obtain first PRS configuration information — 501 determining that the LMF device is unable to provide the first PRS configuration information for the terminal based on a response message, in response to receiving the response message from the LMF device — 502 performing the PRS measurement using the third PRS configuration information based on the second indication information — 503

FIG. 5 sending an on-demand PRS request message to an LMF device, in which the on-demand PRS request message is configured to request to obtain first PRS configuration information — 601 determining that the LMF device is unable to provide the first PRS configuration information for the terminal based on a response message, in response to receiving the response message from the LMF device — 602 performing the PRS measurement using the third PRS configuration information based on the third indication information and/or the fourth indication information — 603

FIG. 6

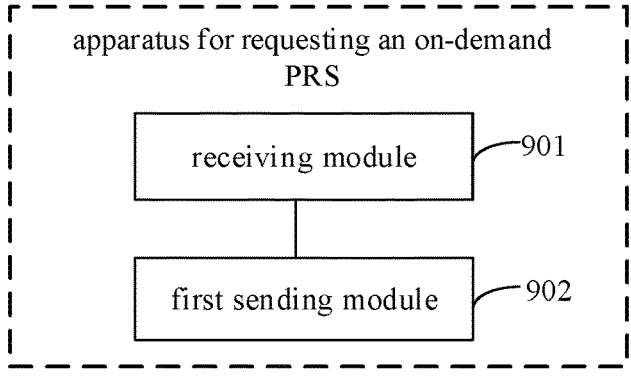
FIG. 9
FIG. 10
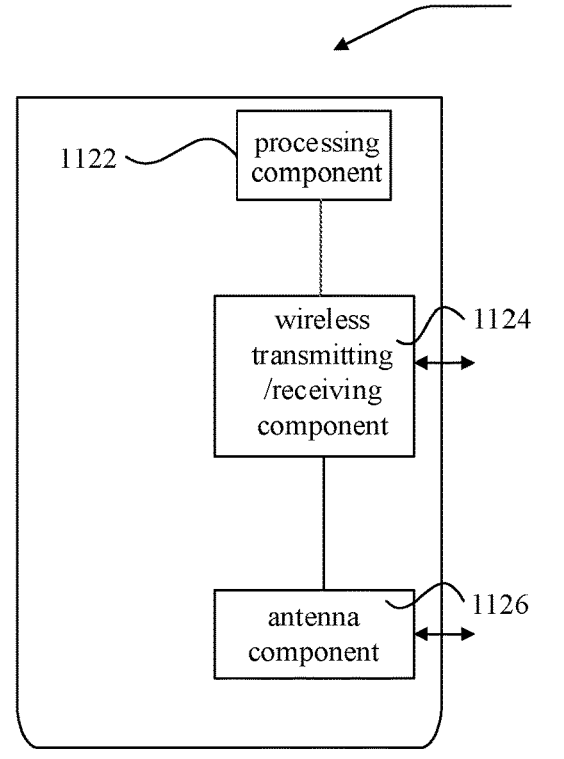
FIG. 11

METHOD FOR REQUESTING ON-DEMAND POSITIONING REFERENCE SIGNAL, TERMINAL AND STORAGE MEDIUM

CROSS-REFERENCE TO RELATED APPLICATION

This application is the U.S. National Stage Application of International Application No. PCT/CN2021/107701, filed on Jul. 21, 2021, the entire disclosure of which is incorporated herein by reference.

TECHNICAL FIELD

The present disclosure relates to a field of wireless communications, and specifically to a method and an apparatus for requesting an on-demand positioning reference signal (PRS), and a storage medium.

BACKGROUND

A plurality of positioning technologies have been introduced in 5th generation (5G) new radio (NR) mobile communication technology, which relate to the positioning of a terminal. For some of the positioning technologies, a network side device is used to provide positioning assistance information for the terminal. In a possible implementation, a location management function (LMF) device may actively provide the positioning assistance information for the terminal. A base station is configured to transparently transmit the positioning assistance information sent by the LMF device to the terminal. In another possible implementation, the LMF device may send the positioning assistance information to the terminal based on a terminal request.

The positioning assistance information includes configuration information of a downlink positioning reference signal (PRS).

In the discussion of an on-demand PRS, it is determined that the network side device may send predefined PRS configuration information to the terminal. The predefined PRS configuration information is configured for the terminal to send an on-demand PRS request message. The terminal may select one piece of PRS configuration information from the predefined PRS configuration information and send a request to a network, and the network may provide required PRS configuration information for the terminal based on the terminal request.

SUMMARY

According to a first aspect of the present disclosure, a method for requesting an on-demand positioning reference signal (PRS) is provided, which is performed by a location management function (LMF) device. The method includes: receiving an on-demand PRS request message from a terminal, in which the on-demand PRS request message is configured to request to obtain first PRS configuration information; and sending a response message to the terminal, in response to determining that the LMF device is unable to provide the first PRS configuration information for the terminal.

According to a second aspect of the present disclosure, a method for requesting an on-demand PRS is provided, which is performed by a terminal. The method includes: sending an on-demand PRS request message to an LMF device, in which the on-demand PRS request message is configured to request to obtain first PRS configuration information; and determining that the LMF device is unable to provide the first PRS configuration information for the terminal based on a response message, in response to receiving the response message from the LMF device.

According to a third aspect of the present disclosure, a terminal is provided. The device includes: a processor; and a memory for storing instructions executable by the processor. The processor is configured to send an on-demand PRS request message to an LMF device, wherein the on-demand PRS request message is configured to request to obtain first PRS configuration information; and determine that the LMF device is unable to provide the first PRS configuration information for the terminal based on a response message, in response to receiving the response message from the LMF device.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show the embodiments in conformity with the present disclosure, and explain the principle of the present disclosure together with the specification.

FIG. 1A and FIG. 1B are flowcharts illustrating a method for providing positioning assistance information for a terminal by an LMF device according to an embodiment.

FIG. 2 is a flowchart illustrating a method for requesting an on-demand PRS performed by an LMF device according to an embodiment.

FIG. 3 is a flowchart illustrating another method for requesting an on-demand PRS performed by a terminal according to an embodiment.

FIG. 4 is a flowchart illustrating another method for requesting an on-demand PRS according to an embodiment.

FIG. 5 is a flowchart illustrating another method for requesting an on-demand PRS according to an embodiment.

FIG. 6 is a flowchart illustrating another method for requesting an on-demand PRS according to an embodiment.

FIG. 9 is a block diagram illustrating an apparatus for requesting an on-demand PRS according to an embodiment.

FIG. 10 is a block diagram illustrating an apparatus for requesting an on-demand PRS according to an embodiment.

FIG. 11 is a structural diagram illustrating a device for requesting an on-demand PRS according to an embodiment.

DETAILED DESCRIPTION

Figure 7:
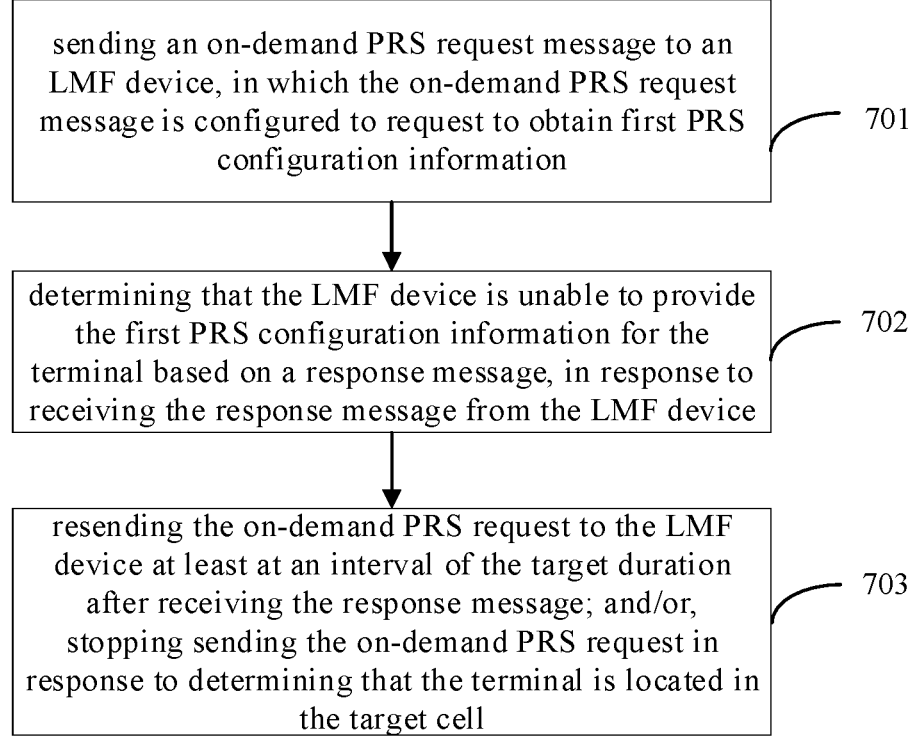
FIG. 7 is a flowchart illustrating another method for requesting an on-demand PRS according to an embodiment.

The embodiments will be described herein, examples of which are shown in the accompanying drawings. When the following descriptions refer to the accompanying drawings, same numbers in different drawings represent same or similar elements unless otherwise indicated. The implementations described in the following embodiments do not represent all implementations consistent with the embodiments of the present disclosure. Rather, they are merely examples of apparatuses and methods consistent with some aspects of the disclosure as detailed in the appended claims.

The terms described in the present disclosure are only for the purpose of describing specific embodiments and are not intended to limit the present disclosure. The singular forms "a", "the" and "said" used in the disclosure and appended claims are also intended to include plural forms, unless the context clearly indicates otherwise. It should also be understood that the term "and/or" used in the disclosure means and includes any or all possible combinations of at least one associated listed items.

It should be understood that, although the terms first, second, third, etc. may be used in this disclosure to describe various information, such information shall not be limited to these terms. These terms are only used to distinguish the same category of information. For example, without departing from the scope of this present disclosure, first information may also be referred to as second information, and similarly, second information may also be referred to as first information. Depending on the context, the word "if" as used herein may be interpreted as "when" or "in response to determining", for example.

There are ways in which the network side device provides positioning assistance information for the terminal in the related art as follows.

In a first way, a location management function (LMF) device actively provides the positioning assistance information for the terminal.

As illustrated in FIG. 1A, the LMF device may provide the positioning assistance information for the terminal via an LTE Positioning Protocol (LPP) message. The LPP message for providing the positioning assistance information may be an LPP provide assistance data message.

In a second way, the LMF device provides the positioning assistance information based on a terminal request.

As illustrated in FIG. 1B, the terminal initiates and sends a request to the LMF device via an LPP message. The LPP message requesting to obtain the positioning assistance information may be an LPP request assistance data message. Further, the LMF device may provide the positioning assistance information for the terminal via an LPP message based on the request message. The LPP message for providing the positioning assistance information is an LPP provide assistance data message.

A base station is not shown in FIG. 1A and FIG. 1B. The base station is only configured to transparently transmit the LPP messages interacted between the LMF device and the terminal in the above processes.

In the embodiments of the disclosure, the positioning assistance information includes downlink PRS configuration information. The downlink PRS configuration information includes but not limited to time-frequency resource location information where the PRS is located, and cycle information of the PRS.

In order to further improve the network efficiency and the positioning accuracy, an on-demand PRS is proposed. The network may send the on-demand PRS configuration supported by itself to the terminal. The terminal may select one piece of PRS configuration information based on the on-demand PRS configuration information provided by the network side and send an on-demand PRS request message to the LMF device, so that the LMF device provides the required PRS configuration information for the terminal based on the on-demand PRS request message. In the embodiments of the disclosure, the LMF device may send predefined PRS configuration information to the terminal based on an LPP message (i.e., LPP provide assistance data message) or a positioning system message. The positioning system message is sent by the LMF to the base station, which is in turn broadcast by the base station to the terminal.

However, after the LMF device receives the on-demand PRS request message from the terminal, there may be following cases in addition to that the LMF device is able to provide the PRS configuration information requested for the terminal.

The LMF device is unable to provide the requested PRS configuration for the terminal. For example, the LMF device receives on-demand PRS request messages from a plurality of terminals, and pieces of PRS configuration information requested by different terminals are different. In this case, it is unknown how the LMF device processes and how the LMF device rejects the on-demand PRS request message from the terminal. The LMF device might need to limit a behavior that the terminal resends the on-demand PRS request message, or indicates the terminal to continue using PRS configuration information that has been obtained.

In order to solve the above technical problem, a solution for requesting an on-demand PRS is provided in the disclosure. A method provided in the disclosure is introduced from the LMF device side.

A method for requesting an on-demand PRS is provided in an embodiment of the disclosure. As illustrated in FIG. 2, FIG. 2 is a flowchart illustrating a method for requesting an on-demand PRS according to an embodiment. The method may be performed by an LMF device, and may include following steps.

At step 201, an on-demand PRS request message is received from a terminal. The on-demand PRS request message is configured to request to obtain first PRS configuration information.

In an embodiment of the disclosure, the on-demand PRS request message may be an LPP message. In a possible implementation, the on-demand PRS request message may be an LPP request assistance data message.

At step 202, a response message is sent to the terminal, in response to determining that the terminal is unable to provide the first PRS configuration information for the terminal.

In the embodiments of the disclosure, the response message may be configured to indicate that the LMF device is unable to provide for the terminal the first PRS configuration information requested by the terminal. The response message may be an LPP message. In a possible implementation, the response message may be an LPP provide assistance data message.

In the above embodiments, a corresponding solution is provided for the situation where the LMF device is unable to provide the requested first PRS configuration information for the terminal, with a high availability.

In some optional embodiments, the response message may include following information.

At step 201, a response message is sent to the terminal, in response to determining that the LMF device is unable to provide the first PRS configuration information for the terminal. The response message includes second PRS configuration information and first indication information.

In an embodiment of the present disclosure, the first indication information is configured to indicate the terminal to perform a PRS measurement using the second PRS configuration information, and the second PRS configuration information is different from the first PRS configuration information the terminal requests to obtain.

That is, when the LMF device is unable to provide the requested first PRS configuration information for the terminal, the second PRS configuration information different from the first PRS configuration information may be provided for the terminal, and the first PRS configuration information indicates the terminal to perform the PRS measurement using the second PRS configuration information different from the first PRS configuration information.

For example, the terminal sends an on-demand PRS request message to the LMF device. The on-demand PRS request message is configured to request the first PRS configuration information. An identifier (ID) of the first PRS configuration information is 1. After the LMF device receives the on-demand PRS request message, since the LMF device receives the on-demand PRS request messages from the plurality of terminals, and pieces of PRS configuration information requested by the plurality of terminals are different, the LMF device is only able to satisfy requests of a part of terminals. The LMF device provides second PRS configuration information with an ID of 2 when the LMF device is unable to provide first PRS configuration information with the ID of 1 for the terminal. When the LMF device provides the second PRS configuration information for the terminal via the response message, in which the response message further includes the first indication information, the LMF device clearly indicates via the first indication information that the terminal performs the PRS measurement using the second PRS configuration information. The second PRS configuration information is different from the first PRS configuration information the terminal requests to obtain. As such, a situation is avoided where the terminal deems that the LMF device sends wrong PRS configuration information.

In the above embodiment, the LMF device may send the second PRS configuration information and the first indication information to the terminal via the response message, to indicate that the terminal performs the PRS measurement using the second PRS configuration information, which avoids a situation where the terminal deems that the LMF device wrongly sends the PRS configuration information, with a high availability.

At step 201, a response message is sent to the terminal, in response to determining that the LMF device is unable to provide the first PRS configuration information for the terminal. The response message includes second indication information.

In an embodiment of the present disclosure, the second indication information is configured to indicate the terminal to perform a PRS measurement using third PRS configuration information. The third PRS configuration information is PRS configuration information that has been obtained before the terminal sends the on-demand PRS request message. Correspondingly, in order to save the signaling resources, the response message does not need to include the third PRS configuration information.

For example, the terminal sends the on-demand PRS request message to the LMF device. The on-demand PRS request message is configured to request the first PRS configuration information. An ID of the first PRS configuration information is 1. After the LMF device receives the on-demand PRS request message and determines that it is unable to provide first PRS configuration information with the ID of 1 for the terminal, the LMF device indicates the terminal to continue using the third PRS configuration information via the second indication information. The third PRS configuration information is PRS configuration information that has been obtained before the terminal sends the on-demand PRS request message. For example, the third PRS configuration information is PRS configuration information obtained from the positioning assistance information provided by the network side device, before the terminal sends the on-demand PRS request message.

In the embodiments of the disclosure, since the terminal has obtained the third PRS configuration information before sending the on-demand PRS request message, the LMF device does not need to carry the third PRS configuration information in the response message, and since the PRS configuration information does not change, the signaling overhead is saved.

In the above embodiments, the second indication information may directly indicate the terminal to perform the PRS measurement using the third PRS configuration information that has been obtained before sending the on-demand PRS request message, and the response message does not need to carry the third link indication information, with a simple implementation and a high availability, which saves the signaling overhead.

At step 201, a response message is sent to the terminal, in response to determining that the terminal is unable to provide the first PRS configuration information for the terminal. The response message includes at least one of third indication information and/or fourth indication information.

In the embodiments of the present disclosure, the third indication information is configured to indicate that the LMF device rejects the on-demand PRS request from the terminal, and the fourth indication information is configured to indicate a reason why the LMF device rejects the on-demand PRS request from the terminal.

In this case, the third indication information and/or the fourth indication information is further configured to indicate the terminal to perform the PRS measurement using the third PRS configuration information. The third PRS configuration information is PRS configuration information that has been obtained before the terminal sends the on-demand PRS request message.

In the above embodiments, the third indication information and/or the fourth indication information may implicitly indicate the terminal to perform the PRS measurement using the third PRS configuration information that has been obtained before sending the on-demand PRS request message. The implementation is simple, and the availability is high.

At step 201, a response message is sent to the terminal, in response to determining that the LMF device is unable to provide the first PRS configuration information for the terminal. The response message includes second PRS configuration information, first indication information and third indication information. Alternatively, the response message includes second PRS configuration information, first indication information and fourth indication information. Alternatively, the response message includes second PRS configuration information, first indication information, third indication information and fourth indication information.

In the embodiments of the present disclosure, the first indication information is configured to indicate the terminal to perform the PRS measurement using the second PRS configuration information, and the second PRS configuration information is different from the first PRS configuration information the terminal requests to obtain. The third indication information is configured to indicate that the LMF device rejects the on-demand PRS request from the terminal, and the fourth indication information is configured to indicate the reason for rejecting the on-demand PRS request from the terminal.

After the terminal receives the response message, it may be determined that the LMF device rejects the on-demand PRS request from the terminal based on the third indication information, and the reason for rejecting by the LMF device the on-demand PRS request from the terminal may also be determined based on the fourth indication information.

In this case, the terminal may perform the PRS measurement using the second PRS configuration information based on the first indication information.

At step 201, a response message is sent to the terminal, in response to determining that the LMF device is unable to provide the first PRS configuration information for the terminal. The response message includes second indication information and third indication information. Alternatively, the response message includes second indication information and fourth indication information. Alternatively, the response message includes second indication information, third indication information and fourth indication information.

The second indication information is configured to indicate the terminal to perform the PRS measurement using third PRS configuration information. The third PRS configuration information is PRS configuration information that has been obtained before the terminal sends the on-demand PRS request message. The third indication information is configured to indicate that the LMF device rejects the on-demand PRS request from the terminal, and the fourth indication information is configured to indicate the reason for rejecting the on-demand PRS request from the terminal.

After the terminal receives the response message, it may be determined that the LMF device rejects the on-demand PRS request from the terminal based on the third indication information, and the reason for rejecting by the LMF device the on-demand PRS request from the terminal may also be determined based on the fourth indication information.

In this case, the terminal may perform the PRS measurement using the third PRS configuration information that has been obtained based on the second indication information.

In the above embodiments, when the LMF device is unable to provide for the terminal the requested first PRS configuration information, the LMF device may indicate the terminal to perform the PRS measurement based on different PRS configuration information via different contents of the response message, with a high availability.

In some optional embodiments, the response message may further include at least one of: a target duration and/or a target cell identifier, in addition to information in the above different cases.

The target duration is configured to indicate a minimum interval duration for the terminal to resend the on-demand PRS request. The target cell ID is an identifier of a target cell for always rejecting the on-demand PRS request from the terminal.

In a possible implementation, the response message that the LMF sends to the terminal includes a target duration. In this case, the terminal may resend an on-demand PRS request message to the LMF device at an interval of at least the target duration. The LMF may reject the on-demand PRS request message from the terminal within a period of time corresponding to the target duration.

In another possible implementation, the LMF device determines the base station or a Transmission Receiving Point (TRP) does not support changing the PRS configuration information based on capability information of the base station or the TRP. In this case, the response message may include a target cell ID, indicating an ID of a target cell for always rejecting the on-demand PRS request from the terminal. The base station may include one or more TRPs, which are not limited in the disclosure.

In another possible implementation, the response message that the LMF device sends to the terminal may include a target duration and a target cell ID simultaneously.

The information contents included in the response message are further illustrated as follow.

For example, after the LMF device receives the on-demand PRS request message from the terminal, the LMF device determines that the base station or the TRP does not support changing the PRS configuration information based on capability information of the base station or the TRP. The response information that the LMF device sends to the terminal includes third indication information and a target cell ID. The third indication information is configured to indicate the LMF device to reject the on-demand PRS request from the terminal. The target cell ID may enable that the terminal does not need to send the on-demand PRS request to the LMF device in response to the terminal being located in the target cell.

For another example, after the LMF device receives the on-demand PRS request message from the terminal, since other terminals are positioning using the first PRS configuration information requested by the terminal, the response message that the LMF device sends to the terminal includes third indication information, fourth indication information and a target duration. The third indication information is configured to indicate the LMF device to reject the on-demand PRS request from the terminal, and the fourth indication information is configured to indicate the reason why the LMF device rejects the on-demand PRS request from the terminal is that other terminals are positioning using the first PRS configuration information. The target duration may be determined by the LMF device based on a time when other terminals complete the positioning. The terminal resends the on-demand PRS request message to the LMF device at an interval of at least the target duration after receiving the response message.

The above are only illustrative. Various information contents included in the response message shall fall within the protection scope of the disclosure.

In the above embodiments, the LMF device may include the target duration and/or the target cell ID in the response message, which avoids the waste of terminal resources caused by the terminal frequently sending the on-demand PRS request message to the LMF device, with a high availability.

In some optional embodiments, when the response message sent by the LMF device includes second PRS configuration information, the second PRS configuration information may be carried in a target information element (IE) of the response message. The target IE is an IE for indicating an on-demand PRS configuration information set.

In a possible implementation, the response message is an LPP provide assistance data message, and the target IE is an IE in the LPP provide assistance data message for indicating the on-demand PRS configuration information set. The IE is the one that has been included in the LPP provide assistance data message according to an agreement. Therefore, a new IE does not need to be added in the LPP provide assistance data message to carry the second PRS configuration information. The signaling resources are thus saved.

In the above embodiments, the response message includes second PRS configuration information, and the second PRS configuration information is carried in the target IE of the response message. The target IE is configured to indicate an IE for indicating the on-demand PRS configuration information set. The resource wastes caused by carrying the second PRS configuration information in a newly added IE may be avoided.

A method for requesting the on-demand PRS provided in the disclosure may be introduced from a terminal side.

A method for requesting an on-demand PRS is provided in a embodiment of the disclosure. As illustrated in FIG. 3, FIG. 3 is a flowchart illustrating a method for requesting an on-demand PRS according to an embodiment. The method may be performed by a terminal, and may include following steps.

At step 301, an on-demand PRS request message is sent to an LMF device. The on-demand PRS request message is configured to request to obtain first PRS configuration information.

In the embodiment of the disclosure, the terminal may determine one piece of PRS configuration information based on the on-demand PRS configuration information provided by the network side device, and send the on-demand PRS request message to the LMF device that requests to obtain the first PRS configuration information.

At step 302, it is determined that the LMF device is unable to provide the first PRS configuration information for the terminal based on a response message, in response to receiving the response message from the LMF device.

In the above embodiments, a corresponding solution is provided for the situation where the LMF device is unable to provide the requested first PRS configuration information for the terminal, with a high availability.

In some optional embodiments, the on-demand PRS request message and the response message are LPP messages. Optionally, the on-demand PRS request message is an LPP request assistance data message. The response message is an LPP provide assistance data message.

In some optional embodiments, the response message may include following information.

At step 402, it is determined that the LMF device is unable to provide the first PRS configuration information for the terminal based on the response message, in response to receiving the response message from the LMF device. The response message includes second PRS configuration information and first indication information.

In the embodiments of the present disclosure, the first indication information is configured to indicate the terminal to perform a PRS measurement using the second PRS configuration information, and the second PRS configuration information is different from the first PRS configuration information the terminal requests to obtain.

That is, when the LMF device is unable to provide the requested first PRS configuration information for the terminal, the second PRS configuration information different from the first PRS configuration information may be provided for the terminal, and the first PRS configuration information indicates the terminal to perform the PRS measurement using the second PRS configuration information different from the first PRS configuration information.

Correspondingly, as illustrated in FIG. 4, FIG. 4 is a flowchart illustrating a method for requesting an on-demand PRS according to an embodiment. The method may be performed by a terminal, and may include following steps.

At step 401, an on-demand PRS request message is sent to an LMF device. The on-demand PRS request message is configured to request to obtain first PRS configuration information.

At step 402, it is determined that the LMF device is unable to provide the first PRS configuration information for the terminal based on a response message, in response to receiving the response message from the LMF device.

The response message includes second PRS configuration information and first indication information. The first indication information is configured to indicate the terminal to perform a PRS measurement using the second PRS configuration information, and the second PRS configuration information is different from the first PRS configuration information the terminal requests to obtain.

At step 403, the PRS measurement is performed using the second PRS configuration information based on the first indication information.

In the above embodiments, after receiving the response message, the terminal may perform the PRS measurement using the second PRS configuration information included in the response message, based on the first indication information in the response message. When the LMF device is unable to provide the requested first PRS configuration information for the terminal, the terminal is enabled to perform the PRS measurement using the second PRS configuration information in the response message that is different from the first PRS configuration information, based on the first indication information in the response message. This has a high availability.

In a possible implementation, the above second PRS configuration information is carried in a target IE of the response message, and the target IE is configured to indicate an IE for indicating an on-demand PRS configuration information set.

At step 502, it is determined that the LMF device is unable to provide the first PRS configuration information for the terminal based on the response message, in response to receiving the response message from the LMF device. The response message includes second indication information.

In the embodiments of the present disclosure, the second indication information is configured to indicate the terminal to perform a PRS measurement using third PRS configuration information. The third PRS configuration information is PRS configuration information that has been obtained before the terminal sends the on-demand PRS request message. Correspondingly, in order to save the signaling resources, the response message does not need to include the third PRS configuration information.

Correspondingly, as illustrated in FIG. 5, FIG. 5 is a flowchart illustrating a method for requesting an on-demand PRS according to an embodiment. The method may be performed by a terminal, and may include following steps.

At step 501, an on-demand PRS request message is sent to an LMF device. The on-demand PRS request message is configured to request to obtain first PRS configuration information.

At step 502, it is determined that the LMF device is unable to provide the first PRS configuration information for the terminal based on a response message, in response to receiving the response message from the LMF device.

The response message includes second indication information. The second indication information is configured to indicate the terminal to perform a PRS measurement using third PRS configuration information. The third PRS configuration information is PRS configuration information that has been obtained before the terminal sends the on-demand PRS request message.

At step 503, the PRS measurement is performed using the third PRS configuration information based on the second indication information.

In the above embodiments, after receiving the response message, the terminal may perform the PRS measurement using the third PRS configuration information that has been obtained before sending the on-demand PRS request message, based on the second indication information in the response message. When the LMF device is unable to provide the requested first PRS configuration information for the terminal, the terminal is enabled to perform the PRS measurement using the third PRS configuration information that has been obtained before sending the on-demand PRS request message, based on the second indication information in the response message. This has a high availability.

At step 602, it is determined that the LMF device is unable to provide the first PRS configuration information for the terminal based on the response message, in response to receiving the response message from the LMF device. The response message only includes at least one of third indication information and/or fourth indication information.

In the embodiments of the present disclosure, the third indication information is configured to indicate that the LMF device rejects the on-demand PRS request from the terminal, and the fourth indication information is configured to indicate a reason why the LMF device rejects the on-demand PRS request from the terminal.

Further, the third indication information and/or the fourth indication information is further configured to indicate the terminal to perform the PRS measurement using the third PRS configuration information. The third PRS configuration information is PRS configuration information that has been obtained before the terminal sends the on-demand PRS request message.

Correspondingly, as illustrated in FIG. 6, FIG. 6 is a flowchart illustrating a method for requesting an on-demand PRS according to an embodiment. The method may be performed by a terminal, and may include following steps.

At step 601, an on-demand PRS request message is sent to an LMF device. The on-demand PRS request message is configured to request to obtain first PRS configuration information.

At step 602, it is determined that the LMF device is unable to provide the first PRS configuration information for the terminal based on a response message, in response to receiving the response message from the LMF device.

The response message includes third indication information and/or fourth indication information. The third indication information is configured to indicate that the LMF device rejects the on-demand PRS request from the terminal, and the fourth indication information is configured to indicate a reason why the LMF device rejects the on-demand PRS request from the terminal. The third indication information and/or the fourth indication information is further configured to indicate the terminal to perform the PRS measurement using the third PRS configuration information. The third PRS configuration information is PRS configuration information that has been obtained before the terminal sends the on-demand PRS request message.

At step 603, the PRS measurement is performed using the third PRS configuration information based on the third indication information and/or the fourth indication information.

In the above embodiments, after receiving the response message, the terminal may perform the PRS measurement using third PRS configuration information that has been obtained before sending the on-demand PRS request message, based on the third indication information and/or the fourth indication information in the response message. This has a high availability.

It is determined that the LMF device is unable to provide the first PRS configuration information for the terminal based on the response message, in response to receiving the response message from the LMF device. The response message includes second PRS configuration information, first indication information and third indication information. Alternatively, the response message includes second PRS configuration information, first indication information and fourth indication information. Alternatively, the response message includes second PRS configuration information, first indication information, third indication information and fourth indication information.

Similar to the process as illustrated in FIG. 4, the terminal may perform the PRS measurement using the second PRS configuration information based on the first indication information.

It is determined that the LMF device is unable to provide the first PRS configuration information for the terminal based on the response message, in response to receiving the response message from the LMF device. The response message includes second indication information and third indication information. Alternatively, the response message includes second indication information and fourth indication information. Alternatively, the response message includes second indication information, third indication information and fourth indication information.

Similar to the process as illustrated in FIG. 5, the terminal may perform the PRS measurement using the third PRS configuration information that has been obtained based on the second indication information.

In the above embodiments, when the LMF device is unable to provide the requested first PRS configuration information for the terminal, the terminal may perform corresponding actions based on different information contents in the response message. This has a high availability.

In some optional embodiments, the response message may further include at least one of: a target duration and/or a target cell ID.

The target duration is configured to indicate a minimum interval duration for the terminal to resend the on-demand PRS request. The target cell ID is an identifier of a target cell for always rejecting the on-demand PRS request from the terminal.

Correspondingly, as illustrated in FIG. 7, FIG. 7 is a flowchart illustrating a method for requesting an on-demand PRS according to an embodiment. The method may be performed by a terminal, and may include following steps.

At step 701, an on-demand PRS request message is sent to an LMF device. The on-demand PRS request message is configured to request to obtain first PRS configuration information.

At step 702, it is determined that the LMF device is unable to provide the first PRS configuration information for the terminal based on a response message, in response to receiving the response message from the LMF device.

The response message may further include a target duration and/or a target cell ID in addition to including the above indication information.

At step 703, the on-demand PRS request is resent to the LMF device at an interval of at least the target duration after receiving the response message; and/or, sending the on-demand PRS request is stopped in response to determining that the terminal is located in the target cell.

In a possible implementation, the terminal performs a duration detection, and resends the on-demand PRS request message to the LMF device at an interval of at least the target duration.

In a possible implementation, the terminal performs a cell detection. The terminal stops sending the on-demand PRS request to the LMF device in response to determining that the terminal is located in the target cell.

In another possible implementation, the terminal performs the duration detection and the cell detection simultaneously.

For example, after the interval of at least the target duration, and when it is determined that the terminal is not located in the target cell, the terminal resends the on-demand PRS request to the LMF device.

For another example, after the interval of the target duration and when the terminal is moved to the target cell, the terminal stops sending the on-demand PRS request to the LMF device.

For another example, when a duration from the terminal receiving the response message to the terminal leaving the target cell has not reached the target duration, the terminal may resend the on-demand PRS request message to the LMF device when a timer for the target duration expires.

The above are only illustrative. The solution in which the terminal performs corresponding actions based on the response message shall fall within the protection scope of the disclosure.

In the above embodiments, the LMF device may include the target duration and/or the target cell ID in the response message, and the terminal avoids based on an indication of the response message, the waste of terminal resources caused by the terminal frequently sending the on-demand PRS request message to the LMF device. This has a high availability.

Figure 8:
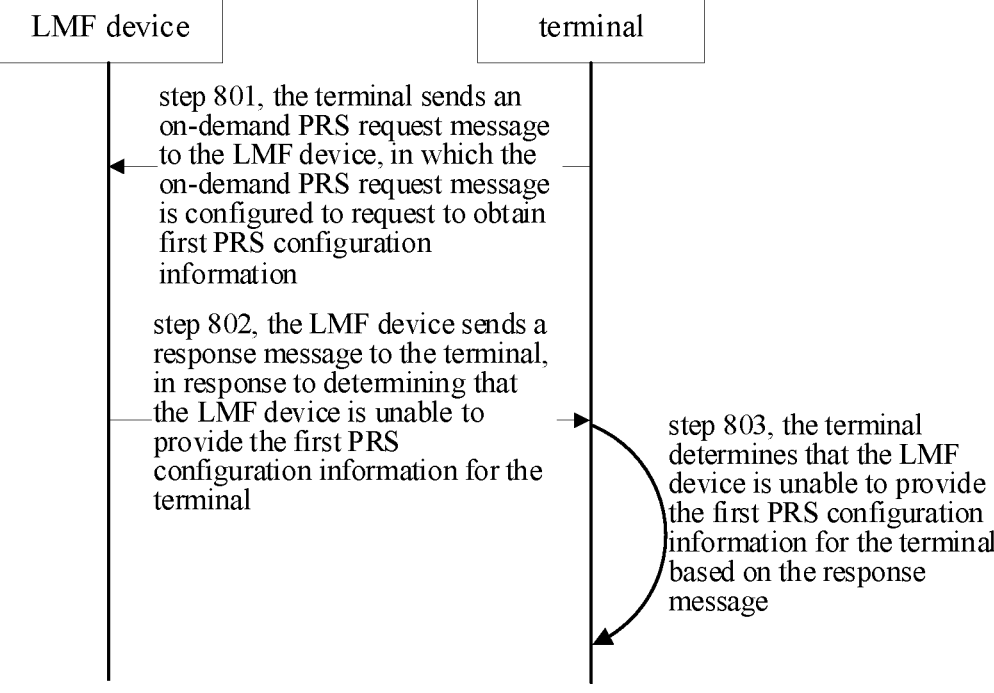
FIG. 8 is a flowchart illustrating another method for requesting an on-demand PRS according to an embodiment.

In some optional embodiments, as illustrated in FIG. 8, FIG. 8 is a flowchart illustrating a method for requesting an on-demand PRS according to an embodiment. The method may include following steps.

At step 801, the terminal sends an on-demand PRS request message to the LMF device. The on-demand PRS request message is configured to request to obtain first PRS configuration information.

At step 802, the LMF device sends a response message to the terminal, in response to determining that the LMF device is unable to provide the first PRS configuration information for the terminal.

At step 803, the terminal determines that the LMF device is unable to provide the first PRS configuration information for the terminal based on the response message.

Of course, when the response message includes different information contents, the terminal may perform different actions. The specific process is consistent with a process in the above any embodiment, which will not be repeated here.

In the above embodiments, after receiving the on-demand PRS request message from the terminal, the LMF device may send the response message to the terminal in response to determining that the LMF device is unable to provide the requested first PRS configuration information for the terminal. The terminal may determine that the LMF device is unable to provide the requested first PRS configuration information for the terminal based on the response message. A corresponding solution is provided in the disclosure for the situation where the LMF device is unable to provide the requested first PRS configuration information for the terminal, with a high availability.

Corresponding to the method embodiments for achieving application functions, apparatus embodiments for achieving application functions are further provided in the disclosure.

As illustrated in FIG. 9, FIG. 9 is a block diagram illustrating an apparatus for requesting an on-demand PRS according to an embodiment. The apparatus is configured in an LMF device. The apparatus includes a receiving module 901 and a first sending module 902.

The receiving module 901 is configured to receive an on-demand PRS request message from a terminal. The on-demand PRS request message is configured to request to obtain first PRS configuration information.

The first sending module 902 is configured to send a response message to the terminal, in response to determining that the LMF device is unable to provide the first PRS configuration information for the terminal.

As illustrated in FIG. 10, FIG. 10 is a block diagram illustrating an apparatus for requesting an on-demand PRS according to an embodiment. The apparatus is configured in a terminal. The apparatus includes a second sending module 1001 and a determining module 1002.

The second sending module 1001 is configured to send an on-demand PRS request message to an LMF device. The on-demand PRS request message is configured to request to obtain first PRS configuration information.

The determining module 1002 is configured to determine that the LMF device is unable to provide the first PRS configuration information for the terminal based on a response message, in response to receiving the response message from the LMF device.

The apparatus embodiments may refer to a part of descriptions of the method embodiments since they basically correspond to the method embodiments. The apparatus embodiments described above are only exemplary. The above units described as separate parts may or may not be physically separated, the parts shown as units may or may not be physical units, which may be located in one place, or may be distributed to multiple network units. Some or all modules may be selected according to the actual needs to achieve the purpose of the disclosure.

Accordingly, a computer-readable storage medium storing a computer program is provided in the disclosure. The computer program is configured to perform any one of the methods at the LMF device side.

Accordingly, a computer-readable storage medium storing a computer program is provided in the disclosure. The computer program is configured to perform any one of the methods at the terminal side.

Accordingly, a device for requesting an on-demand PRS is further provided in the disclosure, and includes: a processor; and a memory for storing instructions executable by the processor. The processor is configured to perform any one of the methods at the LMF device side.

As illustrated in FIG. 11, FIG. 11 is a structural diagram illustrating a device for requesting an on-demand PRS according to an embodiment. The device 1100 may be provided as an LMF device. Referring to FIG. 11, the device 1100 includes a processing component 1122, a wireless transmitting/receiving component 1124, an antenna component 1126, and a signal processing unit specific to a wireless interface. The processing component 1122 may further include at least one processor.

One processor of the processing component 1122 may be configured to perform any one of the above methods for requesting the on-demand PRS.

Accordingly, a device for requesting an on-demand PRS is further provided in the disclosure, and includes: a processor; and a memory for storing instructions executable by the processor. The processor is configured to perform any one of the above methods for requesting the on-demand PRS at the terminal side.

Figure 12:
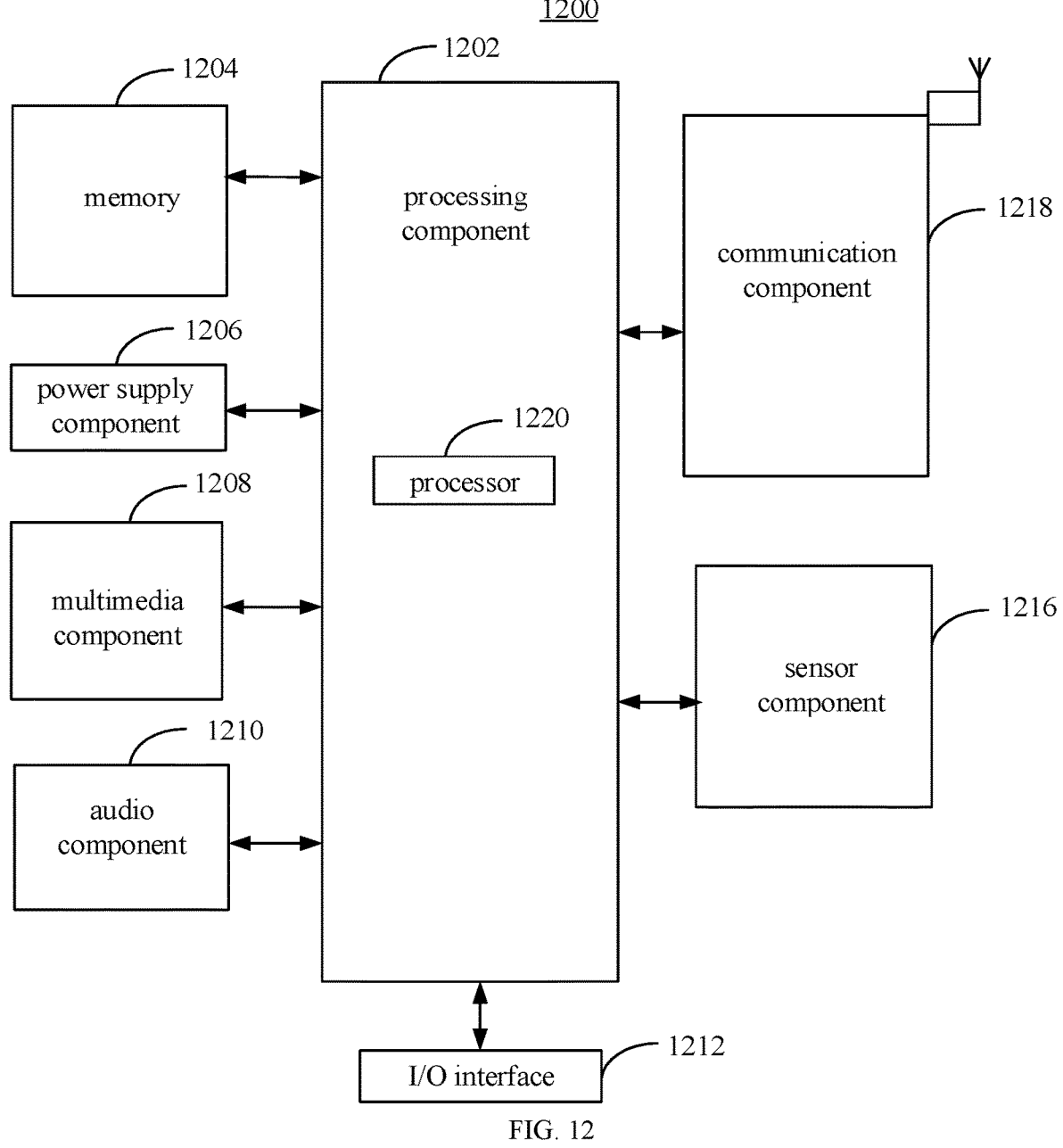
FIG. 12 is a structural diagram illustrating another device for requesting an on-demand PRS according to an embodiment.

FIG. 12 is a structural block diagram illustrating a device for requesting an on-demand PRS according to an embodiment. For example, the device 1200 may be a terminal such as a smart phone, a tablet, an e-book reader, a multimedia playback device, a wearable device, a vehicle-mounted user equipment, an ipad, a smart TV and an unmanned device.

Referring to FIG. 12, the device 1200 may include one or more components: a processing component 1202, a memory 1204, a power supply component 1206, a multimedia component 1208, an audio component 1210, an input/output (I/O) interface 1212, a sensor component 1216, and a communication component 1218.

The processing component 1202 generally controls the whole operation of the device 1200, such as operations related to display, phone call, data random access, a camera operation and a recording operation. The processing component 1202 may include one or more processors 1220 to perform instructions, to complete all or part of steps of the above methods. In addition, the processing component 1202 may include one or more modules for the convenience of interactions between the processing component 1202 and other components. For example, the processing component 1202 may include a multimedia module for the convenience of interactions between the multimedia component 1208 and the processing component 1202. For another example, the processing component 1202 may read executable instructions from the memory, to implement the steps of the methods in the above embodiments.

The memory 1204 is configured to store all types of data to support the operations of the device 1200. Examples of the data include the instructions of any applications or methods operated on the device 1200, contact data, phone book data, messages, pictures, videos, etc. The memory 1204 may be implemented by any type of volatile or non-volatile storage devices or their combination, such as a static random access memory (SRAM), an electrically erasable programmable read-only memory (EEPROM), an erasable programmable read-only (EPROM), a programmable read-only memory (PROM), a read-only memory (ROM), a magnetic memory, a flash memory, a magnetic disk or an optical disk.

The power supply component 1206 may provide power supply for all components of the device 1200. The power supply component 1206 may include power supply management system, one or more power supplies, and other units related to generating, managing and distributing powers for the device 1200.

The multimedia component 1208 includes a display of an output interface provided between the device 1200 and the user. In some embodiments, the multimedia component 1208 includes a front camera and/or a rear camera. When the device 1200 is in an operation mode, such as a shooting mode or a video mode, the front camera or the rear camera may receive external multimedia data. Each of the front camera and the rear camera may be a fixed optical lens system or an optical lens system with a focal length and an optical zoom capacity.

The audio component 1210 is configured to output and/or input signals. For example, the audio component 1210 includes a microphone (MIC). When the device 1200 is in the operation mode, such as a call mode, a record mode, and a speech recognition mode, the microphone is configured to receive the external audio signals. The received audio signals may be further stored in the memory 1204 or sent via the communication component 1218. In some embodiments, the audio component 1210 further includes a speaker configured to output an audio signal.

The I/O interface 1212 provides an interface between the processing component 1202 and a peripheral interface module, and the peripheral interface module may be a keyboard, a click wheel, a button, etc. The buttons may include but not limited to a home button, a volume button, a start button and a lock button.

The sensor component 1216 includes one or more sensors, configured to provide various aspects of status assessment for the device 1200. For example, the sensor component 1216 may detect an on/off state of the device 1200 and a relative positioning of the component. For example, the component is a display and a keypad of the device 1200. The sensor component 1216 may further detect a location change of the device 1200 or one component of the device 1200, a presence or absence of contact between the user and the device 1200, an orientation or acceleration/deceleration of the device 1200, and a temperature change of the device 1200. The sensor component 1216 may include a proximity sensor, which is configured to detect a presence of nearby objects without any physical contact. The sensor component 1216 may further include a light sensor such as a CMOS or CCD image sensor, which is used in imaging applications. In some embodiments, the sensor component 1216 may further include an acceleration transducer, a gyroscope sensor, a magnetic sensor, a pressure sensor or a temperature sensor.

The communication component 1218 is configured for the convenience of wire or wireless communication between the device 1200 and other devices. The device 1200 may access wireless networks based on a communication standard, such as WiFi™, 2G, 3G, 4G, 5G or 6G, or their combination. In an embodiment, the communication component 1218 receives broadcast signals or broadcast-related information from an external broadcast management system via a broadcast channel. In an embodiment, the communication component 1218 further includes a near field communication (NFC) module to facilitate short-range communication. For example, the NFC module may be implemented based on a radio frequency identification (RFID) technology, an infrared data association (IRDA) technology, an ultra-wideband (UWB) technology, bluetooth (BT) technology and other technologies.

In an embodiment, the device 1200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronics components, which is configured to perform any one of the above methods at the terminal side.

In an embodiment, a non-transitory machine-readable storage medium including instructions is further provided, such as the memory 1204 including instructions. The instructions may be executed by the processor 1220 of the device 1200 to complete the above methods for requesting the on-demand PRS. For example, the non-transitory computer-readable storage medium may be a ROM, a random access memory (RAM), a CD-ROM, a magnetic tape, a floppy disk, an optical data storage device, etc.

The technical solution according to the present disclosure may include the following beneficial effect: the LMF device may send the response message to the terminal in response to determining that the LMF device is unable to provide the first PRS configuration information for the terminal, after receiving the on-demand PRS request message from the terminal. The terminal may determine, based on the response message, that the LMF device is unable to provide the first PRS configuration information requested for the terminal. A corresponding solution is provided in the disclosure for the situation where the LMF device is unable to provide the requested first PRS configuration information for the terminal, with a high availability.

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or a conventional technical means in the technical field not disclosed by the present disclosure. The description and the embodiments are to be regarded as exemplary only, and the true scope of the present disclosure are given by the appended claims.

It should be understood that the present disclosure is not limited to the precise structure described above and shown in the drawings, and various modifications and changes may be made without departing from its scope. The scope of the present disclosure is only limited by the appended claims.

What is claimed is:

1. A method for requesting an on-demand positioning reference signal (PRS), performed by a location management function (LMF) device, comprising:
    receiving an on-demand PRS request message from a terminal, wherein the on-demand PRS request message is configured to request to obtain first PRS configuration information; and
    sending a response message to the terminal, in response to determining that the LMF device is unable to provide the first PRS configuration information for the terminal, wherein the response message comprises fourth indication information, the fourth indication information is configured to indicate a reason why the LMF device rejects the on-demand PRS request from the terminal.

2. The method according to claim 1, wherein the on-demand PRS request message and the response message are LTE Positioning Protocol (LPP) messages;
    wherein the on-demand PRS request message is an LPP request assistance data message, and the response message is an LPP provide assistance data message.

3. The method according to claim 1, wherein the response message comprises second PRS configuration information and first indication information;
    wherein the first indication information is configured to indicate the terminal to perform a PRS measurement using the second PRS configuration information, and the second PRS configuration information is different from the first PRS configuration information the terminal requests to obtain.

4. The method according to claim 1, wherein the response message comprises second indication information;
    wherein the second indication information is configured to indicate the terminal to perform a PRS measurement using third PRS configuration information, wherein the third PRS configuration information is PRS configuration information that has been obtained before the terminal sends the on-demand PRS request message.

5. The method according to claim 1, wherein the response message comprises third indication information;
    wherein the third indication information is configured to indicate that the LMF device rejects the on-demand PRS request from the terminal.

6. The method according to claim 5, wherein the response message only comprises at least one of the third indication information or the fourth indication information, the at least one of the third indication information or the fourth indication information is further configured to indicate the terminal to perform a PRS measurement using third PRS configuration information, and the third PRS configuration information is PRS configuration information that has been obtained before the terminal sends the on-demand PRS request message.

7. The method according to claim 5, wherein the response message comprises at least one of: a target duration or a target cell identifier;
    wherein the target duration is configured to indicate a minimum interval duration for the terminal to resend the on-demand PRS request, and the target cell identifier is an identifier of a target cell for the LMF device always rejecting the on-demand PRS request from the terminal.

8. The method according to claim 1, wherein the response message comprises second PRS configuration information, and the second PRS configuration information is carried in a target information element of the response message;
    wherein the target information element is an information element for indicating an on-demand PRS configuration information set.

9. A method for requesting an on-demand positioning reference signal (PRS), performed by a terminal, comprising:
    sending an on-demand PRS request message to a location management function (LMF) device, wherein the on-demand PRS request message is configured to request to obtain first PRS configuration information; and
    determining that the LMF device is unable to provide the first PRS configuration information for the terminal based on a response message, in response to receiving the response message from the LMF device, wherein the response message comprises fourth indication information, the fourth indication information is configured to indicate a reason why the LMF device rejects the on-demand PRS request from the terminal.

10. The method according to claim 9, wherein the on-demand PRS request message and the response message are LTE Positioning Protocol (LPP) messages;
    wherein the on-demand PRS request message is an LPP request assistance data message, and the response message is an LPP provide assistance data message.

11. The method according to claim 9, wherein the response message comprises second PRS configuration information and first indication information;
    wherein the first indication information is configured to indicate the terminal to perform a PRS measurement using the second PRS configuration information, and the second PRS configuration information is different from the first PRS configuration information the terminal requests to obtain.

12. The method according to claim 11, further comprising:
    performing the PRS measurement using the second PRS configuration information based on the first indication information.

13. The method according to claim 9, wherein the response message comprises second indication information;
    wherein the second indication information is configured to indicate the terminal to perform a PRS measurement using third PRS configuration information, wherein the third PRS configuration information is PRS configuration information that has been obtained before the terminal sends the on-demand PRS request message.

14. The method according to claim 13, further comprising:

performing the PRS measurement using the third PRS configuration information based on the second indication information.

15. The method according to claim 9, wherein the response message comprises third indication information;

wherein the third indication information is configured to indicate that the LMF device rejects the on-demand PRS request from the terminal.

16. The method according to claim 15, wherein the response message only comprises at least one of the third indication information or the fourth indication information, the at least one of the third indication information or the fourth indication information is further configured to indicate the terminal to perform a PRS measurement using third PRS configuration information, and the third PRS configuration information is PRS configuration information that has been obtained before the terminal sends the on-demand PRS request message.

17. The method according to claim 16, further comprising:

performing the PRS measurement using the third PRS configuration information based on at least one of the third indication information or the fourth indication information.

18. The method according to claim 15, wherein the response message further comprises at least one of: a target duration or a target cell identifier;

wherein the target duration is configured to indicate a minimum interval duration for the terminal to resend the on-demand PRS request, and the target cell identifier is an identifier of a target cell for the LMF device always rejecting the on-demand PRS request from the terminal.

19. The method according to claim 18, further comprising at least one of:

resending the on-demand PRS request to the LMF device at an interval of at least the target duration after receiving the response message; or, stopping sending the on-demand PRS request in response to determining that the terminal is located in the target cell.

20. A terminal, comprising:

a processor; and a memory for storing instructions executable by the processor;

wherein the processor is configured to: send an on-demand positioning reference signal (PRS) request message to a location management function (LMF) device, wherein the on-demand PRS request message is configured to request to obtain first PRS configuration information; and determine that the LMF device is unable to provide the first PRS configuration information for the terminal based on a response message, in response to receiving the response message from the LMF device, wherein the response message comprises fourth indication information, the fourth indication information is configured to indicate a reason why the LMF device rejects the on-demand PRS request from the terminal.

* * * * *